INVENTOR.
RICHARD M. WHITEHORN
BY
ATTORNEY

FIG. 7

| INSTRUCTION (I) | SYMBOLIC | ACTION |
|---|---|---|
| 0 | EXTERNAL + IF | ACTIVATE EXTERNAL EQUIP. & ADVANCE I FRAME |
| 1 | +(N+I)F + IF | ADVANCE N+I FRAMES & ADVANCE I FRAME |
| 2 | −(N+I)F + IF | RETREAT N+I FRAMES & ADVANCE I FRAME |
| 3 | +(N+I)B + IF | ADVANCE N+I BLOCKS & ADVANCE I FRAME |
| 4 | −(N+I)B + IF | RETREAT N+I BLOCKS & ADVANCE I FRAME |
| 5 | +(N+I)C + IF | ADVANCE N+I CHAPTERS & ADVANCE I FRAME |
| 6 | −(N+I)C + IF | RETREAT N+I CHAPTERS & ADVANCE I FRAME |
| 7 | SEQUENCE + IF | ACTIVATE SEQUENCE CONTROL & ADVANCE I FRAME |

United States Patent Office 3,355,818
Patented Dec. 5, 1967

3,355,818
AUTOMATED INSTRUCTION APPARATUS
Richard M. Whitehorn, Menlo Park, Calif., assignor to Varian Associates, Palo Alto, Calif., a corporation of California
Filed Feb. 27, 1964, Ser. No. 347,941
3 Claims. (Cl. 35—9)

This invention relates to means for processing stored information, and particularly to automated instruction apparatus wherein an adaptive associated logic system employs an external program and image store.

An associative logic system is defined herein as a system that locates and presents a piece of information, given the attributes rather than the file location of the information. In an instructional program implemented by such a logic, new information (instruction with a particular cost) is located on the basis of a choice or sequence of choices made by a student. Also, the logic system of this invention is termed as adaptive because the sequence of presentation of the stored image is dependent on the sequence of choices made by the user or operator of the apparatus.

In recent years, the goal of automating programmed instruction has been approached from two directions. The first approach utilizes equipment that corresponds to automation of a book-like form of programmed instruction. Such equipment employs printed strips of paper, or sequences of photographic images carried on slides or film strips. Often the information so stored is presented in an unvarying sequence. Some attempts have been made to adapt the sequence of information presented to the student, by causing the presentation of new information to depend on the selection of a response to a multiple choice question. One known machine employing such a technique suffers from a very limited repertoire of information selection possibilities, since a small set of electromechanically implemented rules for presenting new material is utilized. Attempts to increase the flexibility of such a machine by providing a large number of pushbuttons or other controls, each corresponding to a particular maneuver by the machine, impose a complex task on the student. In addition, this approach to the problem of flexibility increases cost and reduces reliability in direct proportion to the number of added machine responses. This limitation in response capability has prevented such machines from being much more effective than paper programmed instructional materials.

These limitations of simple electromechanical program presenting equipments have stimulated a second approach to the problem, namely, employing internal stored program electronic digital computing equipment. The most striking disadvantage to this approach is the extraordinary expense involved. Attempts have meen made to reduce his expense by connecting many students to a single computer. These attempts have not been successful because a requirement for random access to the computer by each student does not permit economical utilization of computer time. Also, the equipment which must be provided to each student to allow him to communicate with the computer is quite complex and expensive.

There are other more subtle and fundamental difficulties. Digital storage, which permits multiple random access, is not well adapted to the storage of graphic materials. The images must either be recreated, as with an electric typewriter, or stored on film or slides that can be selected by the computer. Either an individual slide or film store must be provided for each student, or some very expensive means such as television must be employed to distribute selected images to the students. In any event, there are additional problems of maintaining correspondence between the stored program of the computer and the image store.

An object of this invention is to provide a novel and improved automated instruction apparatus.

Another object of this invention is to provide an information storage and processing apparatus that employs a novel logic system.

Another object is to provide a teaching apparatus that employs an external program and image storage.

According to this invention, an automated instruction or study system comprises a means for storing data in units or frames, a mechanical drive system for transporting the storage means intermittently or in discrete steps for a preprogrammed number of frames to a first selected frame, means for readout of the first selected frame, means for activating a response to such frame that has been read, coded means associated with each frame for interpreting such response, and a logic and control network that responds to the coded means whereby the storage means is transported to a second selected frame that bears associative logic relationship to the first selected frame and the users' response.

In an embodiment of this invention, a teaching machine employs a photographic film as a program and image store consisting of a multiplicity of frames that may be driven bidirectionally and intermittently. A part of each frame contains an image, and another part contains control logic in the form of light transparent or opaque coded bits or patches arranged in a predetermined format, which is repeated on each frame. The various patterns or permutations of bits or patches are interrelated and constitute an integral logic code. Each individual frame bit pattern provides command logic, including an instruction and number, to control the direction and distance of film travel, i.e., the number of frames traversed, when progressing from one selected frame to the next selected and related frame.

When a frame is being viewed while stationary, the frame is in alignment with a bank of light sensing elements or photodetectors having a matrix or format coincident with the bit format. Upon selection of a key by the user as a response to the frame, a portion of the photodetectors is energized resulting in the setting of a register of a control network. The control network serves to activate the film transport, and also may energize external equipment, in accordance with the signal fed to the control network. Means are also provided for registering the content of a sequence of user responses as a score or as a pattern. The mechanical driving means of the film transport will then locate and display a new frame defined by the sequence of user responses and the program content. The equipment is adapted to employ a hierarchal system of frame labeling so that blocks or chapters of frames may be processed in the same way as individual frames.

The invention will be described in greater detail with reference to the accompanying drawings in which.

Figures 1, 3, 4, 5:
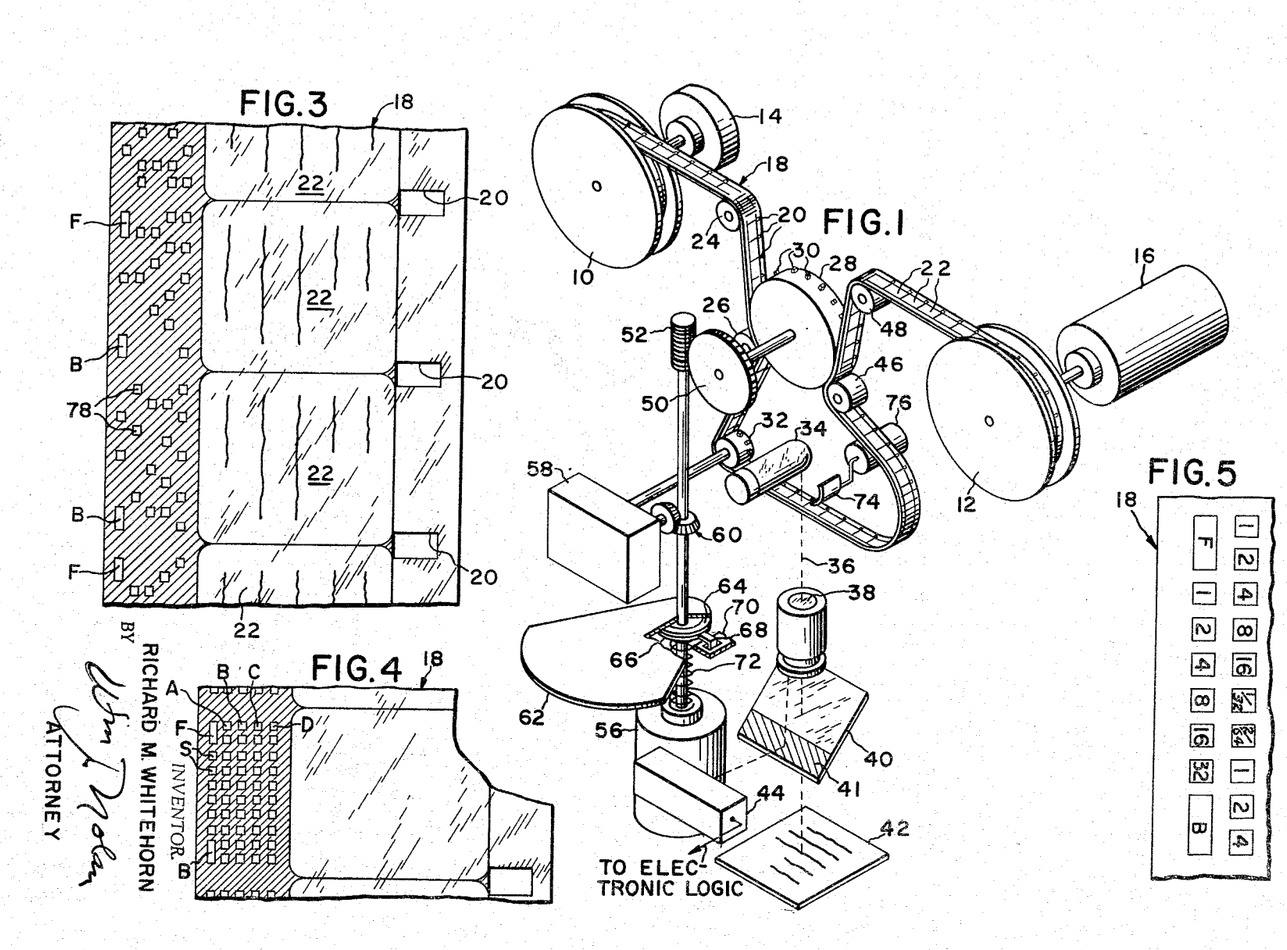
FIG. 1 is a schematic view, partly broken away, of the mechanical and optical systems of the inventive apparatus.
FIG. 3 is a plan view of a segment of film utilized in accordance with this invention, including two complete frames with coded patterns.
FIG. 4 is a plan view of a portion of film, showing the format of coded bits associated with each frame.
FIG. 5 is a view of a portion of the bit format indicating the assigned count values for the several bits.

With reference to FIG. 1, a film transport in accordance with this invention includes a pair of spaced reels 10 and 12 that are driven separately by torque motors 14 and 16. Motor 14 is shown partly broken away for convenience. An elongated photographic film 18 having evenly spaced sprocket holes 20 is driven in either direction between the reels 10 and 12, and is guided by sprocketed gears, and idlers, disposed along the path of travel of the film 18. The film 18 consists of a sequence of frames 22, each frame 22 containing an image and digital program data.

Figure 13:
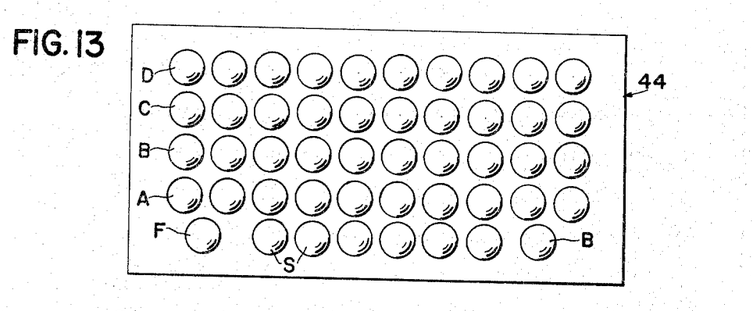
FIG. 13 is a plan view of the matrix of photosensing devices employed in one embodiment of the invention.

With the film 18 disposed as shown, the "Advance" direction of film transport is from reel 10 to reel 12. The film 18 is drawn over an idler 24 into contact with a continuous sprocket wheel 28 where the sprocket holes 20 are engaged by sprocket teeth 30. The film 18 leaves contact with the continuous sprocket wheel 28 as it passes over an idler 26. The film is then engaged by an intermittent sprocket wheel 32 which drives the film between a lamp 34 and a projection lens 38. A beam of light 36, carrying both the image and digital program data impinges on a partial mirror 40. The portion of the beam 36 carrying the image passes through the transparent portion of the partial mirror 40 and is focused on a viewing screen 42 where it may be viewed by the user. The remainder of the beam 36 carrying the digital program data is reflected by the silvered portion 41 of the partial mirror 40 and is focused on a photocell array 44 to be described in greater detail with reference to FIGS. 6 and 13.

The film 18 continues on until it passes under an idler 46 and is engaged by the continuous sprocket wheel 28. The film leaves contact with the continuous sprocket wheel 28 as it passes over an idler 48 and is wound on reel 12 by the action of torque motor 16.

The continuous sprocket wheel 28 is driven by a transport motor 56 via a worm 52 and worm wheel 50. The worm 52, worm wheel 50 and the continuous sprocket wheel 28 are chosen so that as the transport motor 56 rotates, the constant length of film maintained between the idlers 26 and 46 is transported continuously one frame for each revolution of the transport motor 56.

A right angle gearing 60 transmits the rotation of the transport motor 56 to a Geneva intermittent motion mechanism 58, which transmits an intermittent rotation to the intermittent sprocket wheel 32. The intermittent sprocket wheel 32 transports the film one frame for every revolution of the transport motor. This transport occurs during a fraction (typically ⅜) of a revolution of the transport motor.

Figure 2:
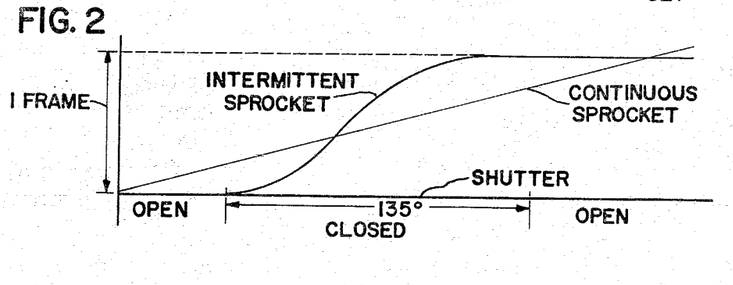
FIG. 2 depicts a time relationship between moving parts of the apparatus, that will aid in the explanation of the invention.

A shutter 62 is fixed to the transport motor shaft. Shutter 62 interrupts the beam 36 during the time that the film is transported by the intermittent sprocket wheel 32. This action of the shutter ensures that the patterns of light forming the projected image and digital program data do not move as the film is transported but appear as a sequence of stationary patterns. FIG. 2 is a timing diagram that displays these relationships graphically.

This particular implementation was chosen to minimize the inertia of the moving portions of this mechanism. When the shutter 62 opens on a frame 22 selected by the electronic logic, the mechanism must be stopped before the shutter 62 will again interrupt the beam 36, despite the fact that it has been operating at high speed (typically 48 frames per second). When the electronic logic commands the film transport to stop after the shutter 62 opens on a selected frame, a simple electronic braking system (to be described with reference to FIG. 14) removes most of the rotational energy of the mechanism. The residual energy is absorbed by a brake comprising a felt annulus 64 glued to the shutter 62, a brake plate 66, a dog 68 engaging a fixed portion of the structure 70, and a spring 72. A constant pressure is maintained by the spring 72 on the brake plate 66 which is prevented from rotating by the dog 68.

A secondary shutter 74 operated by rotary solenoid 76 is controlled by the electronic logic so as to obscure the image portion of the frames during film transport except when it is desired to display a sequence of images as a motion picture. The digital program data is not obscured by secondary shutter 74.

A portion of the film is shown in FIG. 3, wherein an image is registered on a major central portion of each frame 22, and coded bits 78 constituting the digital program data are located in predetermined patterns adjacent to each image. In FIG. 4, an uncoded format of bits is shown for a frame, which consists of four rows A, B, C, and D, of ten bits each, and one row having six Supervisory (S) bits between the two elongated bits designated as the Frame (F) and Block (B) bits respectively. Each bit row A, B, C, and D represents a separate response interpretation code, the first three bits of each response interpretation code providing an Instruction (I) whereas the seven remaining bits provide a Number (N).

In FIG. 5, one row A of ten bits is illustrated adjacent to the Supervisory row that includes (F) and (B) bits. The three Instruction bits in row A closest to the (B) bit have counting values of 4, 2, and 1 in that order, and $0 \leq I \leq 7$. The remaining seven bits in the row have count values from 64 to 1 such that $0 \leq N \leq 127$. The bits labeled 2/64 and 1/32 may sometimes have the values 2 and 1 in connection with SEQuence operations. This matter is discussed in connection with the machine logic. In the counting control row which includes the (F) and (B) bits, six Supervisory (S) bits having count values from 1 to 32 are shown, so that $0 \leq S \leq 63$. It is to be understood that the format described herein may be varied to include a different number of bits arranged in different configurations, and that the scope of the invention is not limited to this particular format presented by way of example.

Figure 6:
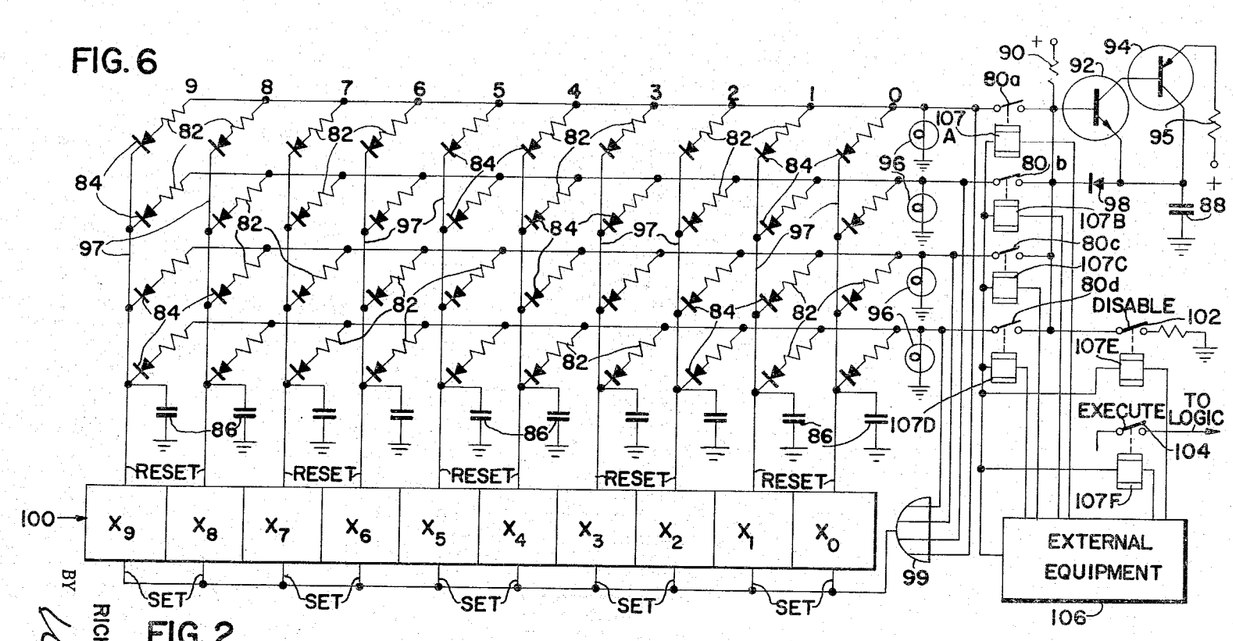
FIG. 6 is a schematic circuit, partly in block, of the photosensing system and associated circuitry that are utilized, in accordance with this invention.

In operation, when the apparatus is first turned on, a preliminary image may be exhibited to the student with an instruction to start by depressing one of the selector keys 80, shown in FIG. 6. Each selector key 80 is matched with a row A, B, C, or D that includes a multiplicity of photosensitive devices or photoresistors 82 that are aligned in columns 0–9, depicted in FIG. 13. Each photoresistor 82 is coupled to a unidirectional conducting device or diode 84 that serves to prevent back currents to the photoresistor 82. The photoresistors 82 may be cadmium sulphide photocells, for example, arranged in a mosaic that corresponds to the format of code bits or patches 78 on the film 18.

When the machine is turned on, bias current flows through a resistor 90 into the base of an NPN transistor 92 that supplies a larger current to the base of a PNP transistor 94 inducing a still larger current, limited by resistor 95, to flow from the positive terminal charging a capacitor 88. When a selector key 80 A, B, C, or D is closed, current flows from capacitor 88 through a diode 98, through the closed key 80 and through a load resistor and lamp 96. The voltage drop across diode 98 cuts off transistor 92 and hence transistor 94 so that the capacitor 88 is disconnected from the power supply while the key is depressed. The positive voltage surge appearing across the selected load resistor and lamp 96 is applied via an OR gate 99 to the SET terminals of register elements 100, $X_0$ through $X_9$. These register elements respond only to the change in voltage applied to the SET terminals, so once having been set they are free to be acted on in other ways.

Within a few milliseconds of closure of a selection key 80, current supplied by the voltage drop across the selected load resistor and lamp 96 will flow through those photoresistors 82 that have been illuminated via a transparent patch 78 (FIG. 3) in the digital program data of the frame, and which are also members of the selected row A, B, C, or D.

These currents flow through column conductors 97 to the RESET terminals of the corresponding register elements 100. These register elements are reset so that, after capacitor 88 has discharged, register elements 100 corresponding to opaque bits 78 of the selected row remain set while register elements corresponding to transparent bits 78 of the selected row are reset. Set is defined as "1," and an opaque element of the digital program data is defined as "1." Therefore, the actions described above have entered the digital program data contained in a selected row of the frame into the register. Capacitors 86 minimize the effects of switching transients conducted through self capacitance of the photoresistors 82.

If now, the user releases the selector key opening the circuit, capacitor 88 will be recharged. If the user then operates another key all register elements will be set, erasing previous entries, and new data will be entered as register elements are reset by the photoresistor array. Under some conditions, discussed in connection with FIG. 8, set of register elements $X_0$ through $X_4$ is inhibited so that data may be accumulated in these register elements.

Figure 8:
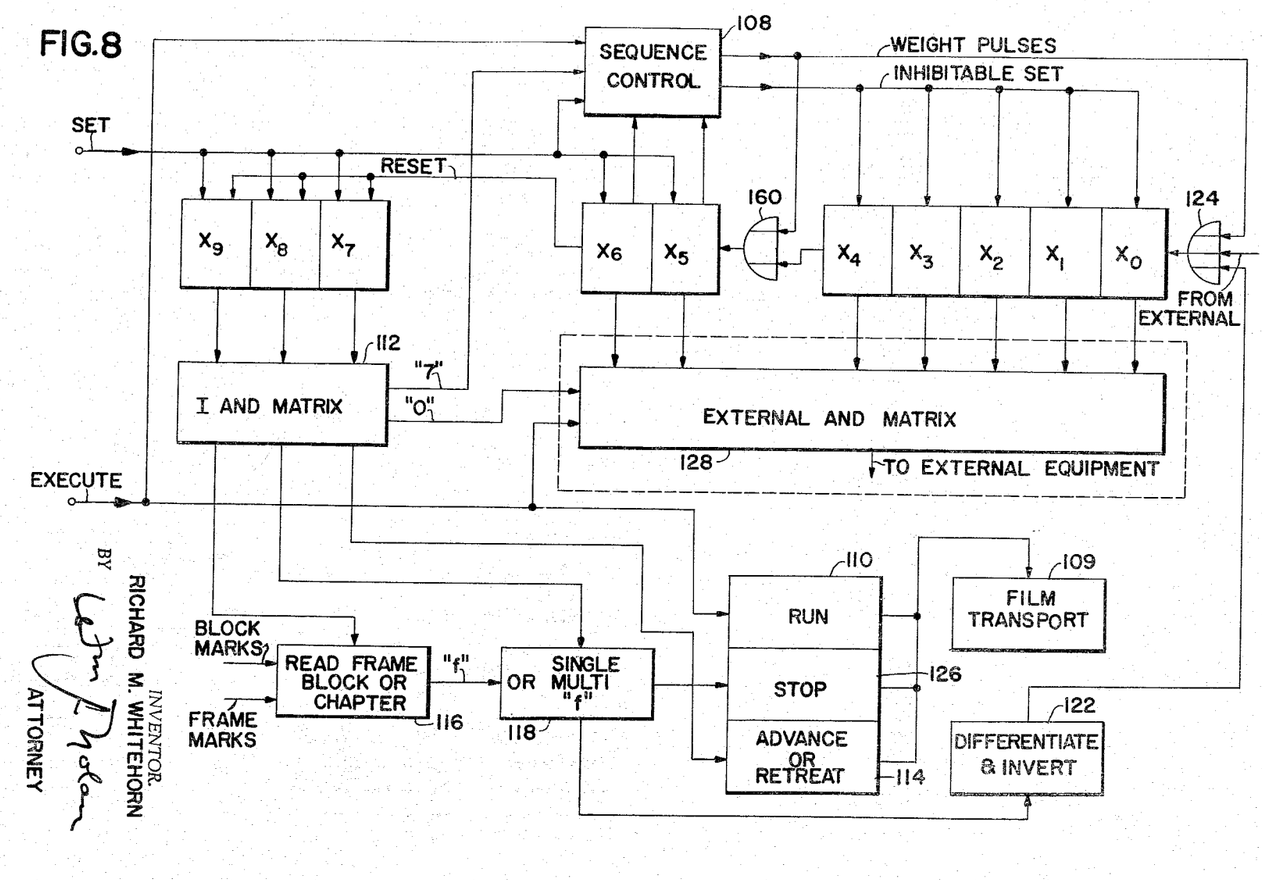
FIG. 8 is a block diagram broadly representing the logic flow system employed in this embodiment of the invention.

When the user has made a selection, operation of an "Execute" switch 104 will cause the electronic logic, discussed in connection with FIG. 8, to act on the data entered in the register. Coils 107 A through F are provided to permit external equipments to operate these controls in place of the user or to disable the controls via a "Disable" switch 102.

Figure 7:
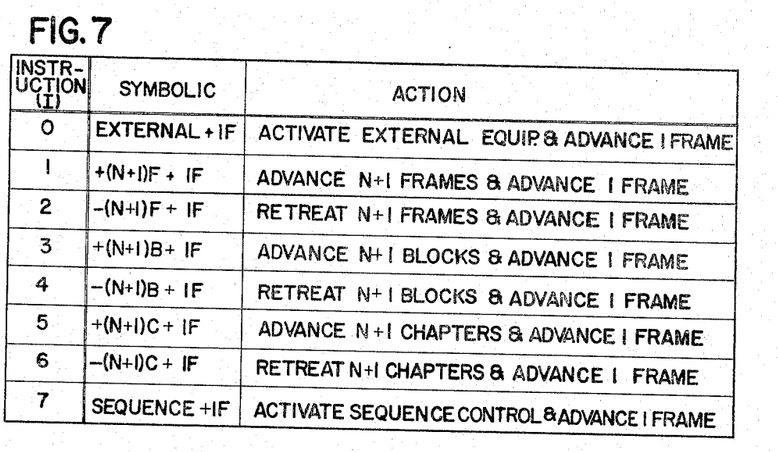
FIG. 7 is a chart displaying the actions achieved in response to each instruction number.

As defined with reference to FIG. 5, the register elements $X_9$, $X_8$, $X_7$ constitute an Instruction (I) where $0 \leq I \leq 7$. In FIG. 7, a chart illustrates the actions associated with each Instruction code number 0 through 7. For each Instruction code number, the machine will advance or retreat by Frames, Blocks, or Chapters.

As described heretofore, the code format on the film includes a patch (F) for counting Frames, and a patch (B) for counting Blocks. Both patches may be utilized in combination to count Chapters (C). A frame marked as a Chapter counts as a Frame or Block as well as a Chapter.

When $I=0$ and $0 \leq N \leq 127$, the Instruction commands the machine to make a single frame advance and to activate an external equipment 106, defined by N, such as a magnetic tape apparatus, which will assume control at least temporarily. During operation under control of the external equipment 106, the logic of such equipment may dominate via the disable coil 107E. When $I=7$, the Instruction commands the machine to make a single Frame advance and to make a modification of its logical structure which will accumulate data from a sequence of user selections.

Each action of the film transport terminates in a single Frame advance to ensure that all mechanical backlash is taken up and the film transported to an accurately determined position. This is true even of a code such as $I=2$, $N=0$ which produces the action $-(0+1)F+1F$ or retreat one Frame and advance one Frame for no net change of position.

With the elements $X_9$–$X_0$ of the register 100 set in accordance with the sensed bit code pattern appearing on the frame being observed, the "Execute" command activates a logic control system that responds to the stored Instruction and Number. In FIG. 8, a representational logic block diagram illustrates the flow of logic utilized in this embodiment of the invention. The register elements employed are flip-flops. Elements $X_9$ through $X_7$ are simply a register, elements $X_6$ through $X_0$ are interconnected to form a counter. As described before, when a key 80, A, B, C, or D is closed, the set pulse that is generated sets $X_9$ through $X_5$ to "1," and may pass through an inactive sequence control 108 to set $X_4$–$X_0$ to "1." Subsequently, the illuminated photocells 82 reset corresponding flip-flop to "0."

When the "EXECUTE" pulse is initiated, the film transport 109 begins to run under control of Logic block 110, transporting the film 18 in accordance with the stored instruction.

The Instruction (I), entered in the $X_9$–$X_7$ is interpreted by the I AND matrix, and an appropriate control voltage is applied to the "Read Frame, Block or Chapter," block 116. This block produces "$f$" pulses. If Instructions $I=0, 1, 2, 7$, which call for Frame counting, are entered, and "$f$" pulse will be produced every time the shutter 62 (FIG. 1) opens on a frame bearing a Frame (F) mark. If Instructions $I=3, 4$ which call for Block counting are entered, an "$f$" pulse will be produced for each (B) mark. If $I=5, 6$ is entered, an "$f$" pulse is produced for each frame bearing both (F) and (B) marks.

Figures 9, 10, 11, 12:
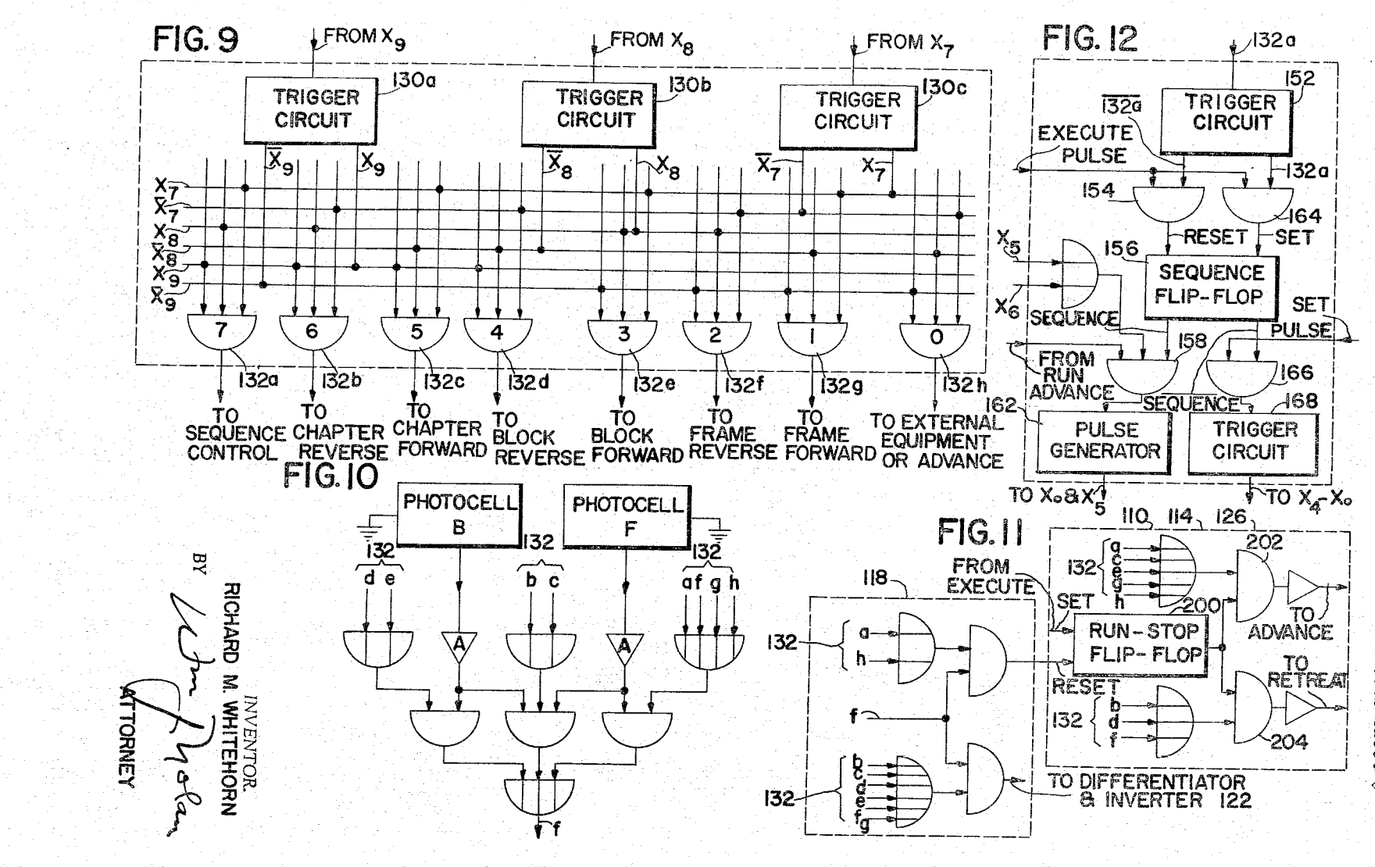
FIG. 9 is a schematic and block diagram of a logic matrix employed in the logic system of FIG. 8.
FIG. 10 is a schematic circuit diagram of the "Read" logic circuit shown in FIG. 8.
FIG. 11 is a diagram of the "single or multiframe" logic circuit used in the system of FIG. 8.
FIG. 12 is a block diagram of the sequence control circuit found in FIG. 8.

The structure of the I AND matrix is illustrated schematically in FIG. 9. Here $X_7$ is 1 if a 1 has been entered in $X_7$, $\overline{X}_7$ is 1 if a 0 has been entered in $X_7$. This inversion is provided by the trigger circuits 130a, b, c. The output of the "3" AND is 132e and is a 1 if $X_7$ AND $X_8$ AND $\overline{X}_9$ are 1.

Similarly, the operation of the "Read Frame, Block or Chapter" block is illustrated in FIG. 10. The operation of the block can be stated as: "$f$" equals one, if 132a OR 132f OR 132g OR 132h are 1 AND F is 1 OR
if 132b OR 132c are 1 AND F is 1 AND B is 1 OR
if 132d OR 132e are 1 AND B is 1

By these means "$f$" pulses are generated when the shutter 62 opens on frames bearing markings corresponding to the Instruction, (I), entered in $X_9$–$X_7$. These "$f$" pulses are steered by the Single or Multi "$f$" block, 118, either to the Stop control 126, or via the Differentiate and Invert block 122 and OR gate 124, to the trigger input of flip-flop $X_0$.

If the Instruction (I) is 0 or 7, calling for a single Frame advance, the transport will advance and Frame marks will generate "$f$" pulses that will be applied to the Stop control 126. Therefore, as the shutter 62 opens on the first frame having a transparent Frame patch, the transport 109 will stop and display that frame.

If the Instruction is $1 \leq I \leq 6$ calling for a multi "$f$" response, the transport 109 will run in the appropriate direction; and as the shutter opens on a frame bearing the marking called for in the Instruction (I), F for $I=1, 2$; B for $I=3, 4$; C for $I=5, 6$, an "$f$" pulse is generated. When $1 \leq I \leq 6$ is entered in $X_9$–$X_7$, the "$f$" pulses are steered via blocks 118, 122, and OR gate 124 to the $X_0$ trigger input. Register stages $X_6$–$X_0$ are connected as a countdown counter so that as each "$f$" pulse is generated, the Number N stored in $X_6$–$X_0$ is reduced by one. As the Nth "$f$" pulse is generated, the stored number becomes zero. When the $N+1$th "$f$" pulse is generated, all counter stages flip to 1 (the stored number changes from 0 to 127) and a carry pulse is generated by $X_6$. This carry pulse is applied as a RESET pulse to $X_9$–$X_7$ changing the Instruction I to 0 which calls for a single frame advance. By these means $1 \leq I \leq 6$ calls for an advance or retreat of $N+1$ frames bearing the Frame, Block or Chapter marking, and then for a single Frame advance.

The differentiation and inversion operation 122, performed on the "f" pulses causes the counting portion of the register $X_6$–$X_0$ to count trailing edges of "f" pulses. Thus, at the time the Instruction is changed from $1 \leq I \leq 6$ to $I=0$, the input to the Single or Multi "f" control 118 has disappeared and the next "f" pulse will activate the Stop control 126.

Figure 14:
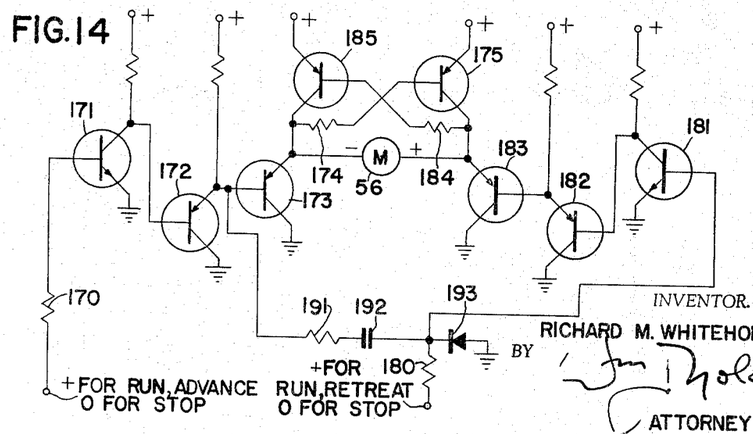
FIG. 14 is a schematic circuit diagram of the film transport control amplifier.

The transport control amplifier is shown in FIG. 14. The Run, Stop, Advance or Retreat complex, 110, 126, 114, respectively, applies control voltages as shown. With Stop signals applied (0 volts) all transistors are nonconducting. If voltage of the polarity shown is applied to the motor 56, the film will Advance.

If a Run, Advance signal is applied, transistors 171, 172, 173 and 175 become conducting and voltage of the polarity shown is applied to the motor 56, causing the film to Advance. When the input signal changes to Stop, the base of amplifier transistor 173 is carried positive as transistors 171 and 172 become nonconducting. This causes transistors 173 and 175 to become nonconducting and, in addition, causes a positive pulse to be applied via series resistor 191 and capacitor 192, to the base of transistor 181. This pulse causes transistors 181, 182, 183 and 185 to become conducting momentarily applying a reversed voltage to the motor 56. Resistor 191 and capacitor 192 are proportioned so that the pulse duration is just sufficient to bring the motor 56 to a stop. The pulse duration does not change with supply voltage so this braking adjustment holds for a range of supply voltages. Any residual rotational energy is absorbed by the brake formed by the shutter 62, felt annulus 64 and brake plate 66, FIG. 1. The drag supplied by this brake is typically ⅕ the stalled torque of the motor 56.

Electronic braking is not provided for reverse running of the motor since the machine logic provides for an advance to follow any retreat transport. Diode 193 is provided to prevent application of high reverse voltage to the base of transistor 181 at the beginning of an advance.

The detailed logic of blocks 118, 110, 126 and 114 is shown in FIG. 11.

The trailing edge of an Execute pulse sets the Run-Stop flip-flop 200 whose output is applied to two AND gates 202 and 204. A Run, Advance signal is generated if:

132a OR c OR e OR g OR h AND RS=1

A Run, Retreat signal is generated if:

132b OR d OR f AND RS=1

Pulses will be applied via the Differentiation and Inverter 122 to the register 100 input stage $X_0$ if:

132b OR c OR d OR e OR f OR g AND f=1

This process will continue until an $N+1$th "f" pulse is generated. Then, an "f" pulse is applied to reset the Run, Stop flip-flop if:

132a OR h AND f=1

When an Instruction $1 \leq I \leq 6$, has been completed, the register is left in the state $I=0$, $N=127$. States of the type $I=0$, $N=127$ can be produced only by entry from a frame. The state $I=0$, $N=0$ is reserved for use in connection with $I=7$. Either $I=0$, $N=0$ or 127 may be entered from a frame to produce simple single Frame advances.

The set of states $I=0$, $1 \leq N \leq 126$ are used to control EXTernal devices. These states are recognized by the "EXT AND matrix (128). The matrix 128 which comprises a multiplicity of AND gates is not described in detail since such matrices are known in the art and a detailed description is not deemed necessary for explanation of the instant invention. A typical set of EXT instructions is:

$I=0$ $N=1$ Play tape to Stop, Inhibit key until Stop
$I=0$ $N=2$ Mute tape, fast forward to Stop
$I=0$ $N=3$ Mute tape, fast reverse to Stop
$I=0$ $N=4$ Rewind
$I=0$ $N=5$ Play 8 mm. to Stop, Inhibit key set until Stop
$I=0$ $N=6$ Advance Paper $N=1$, 2, 3 are Instructions to a magnetic tape player. "Stop" is a control pulse recorded on the tape. Execute pulses can also be recorded on the tape. With $I=0$ entered, they will cause single Frame advances of the film.

$N=4$ is a generalized Instruction to all EXTernal devices to return themselves to some initial condition.

$N=5$ is much like $N=1$ except that it pertains to an 8 mm. film viewer.

$N=6$ instructs a roll of paper (which may be used as a projection surface) to advance and so present a clean surface. A student may have filled in some projected blanks, compared these with answers on a following frame and now needs a clean surface. Such commands may serve to initiate activity of EXTernal devices, at the time of an Execute pulse, as is true in the examples given. Alternatively, the EXTernal device may operate only so long as the command is given to it.

A large variety of activities can be carried out via EXTernal devices which may generate Execute pulses, read frames and supply their own stimuli to the user in connection with the images projected by the inventive machine. An EXTernal device may also make entries via OR gate 124 (FIG. 8).

The SEQuence Instruction $I=7$, changes the logical organizaiton of the equipment so that data can be accumulated from a number of frames. When $I=7$ has been transferred from the frame to the register the Execute pulse which follows does the following things.

On the leading edge:

(1) Inhibits application of Set pulses to register elements $X_0$–$X_4$. The Set pulses pass through the SEQ control block 108. (Note: this operation has its effect on the *next* frame since Set for this frame has already occurred.)

(2) Initiates a single Frame advance (just as if $I=0$ had been entered).

On the trailing edge:

(3) Starts a pulse generator which applies "Weight" pulses to $X_5$ and $X_0$ via OR gates 160 and 124 so long as either $X_5$ OR $X_6$ are 1.

The effect of operation 3 (above) is subtract a Number W, $0 \leq W \leq 3$, stored in $X_5$ and $X_6$ from a Number N, $0 \leq N \leq 31$, stored in $X_0$ through $X_4$. N may just have been entered from a frame or may have been entered some time back and been preserved by the combined effect of operation 2 (above) and the blackening of the frame elements corresponding to $X_0$ through $X_4$ ($N=31$) on intermediate frames. A transparent bit will cause Reset as explained below under Vector Sequence operation. A number of weights, W, may have been subtracted from an original N on past frames. Different W's may be entered from a given frame depending on the key chosen by the user.

Finally, a frame arrives bearing a code in which one selection is $I=3$, $N=31$. The Set function is inhibited by the preceding $I=7$, $N=31$ ($X_0$ through $X_4$ are all 1) so the number stored in $X_0$ through $X_4$ is not disturbed. When the Execute pulse is generated, the leading edge:

(1) Initiates an $(N+1)$ Block plus 1 Frame Advance (since $I=3$).

(2) Enables the next Set to operate on $X_0$ through $X_5$ and inhibits the circuits which would, at the trailing edge, generate weight pulses if $X_5$ OR $X_6$ were 1.

The film transport moves the film until a frame is reached bearing an image appropriate to the N stored in the register at the time of the Execute pulse. Grouped about this Block are a number of Frames containing further appropriate images. The results of a SEQuence may be evaluated by advancing or retreating by Frames, Blocks or Chapters.

This mode of SEQuence operation is called a Scalar Sequence since all selections included in a sequence are treated alike except for the magnitude of W. A selection in which $W=3$ is equivalent to three choices in which $W=1$. An example of such a SEQuence is a multiple choice test in which varying "credit" is given for different answers in order to compile a "SCORE." The frame presented as the result of the whole operation may be both an evaluation of the test and the start of remedial or new instruction as appropriate to the score.

A possible entry from the last Frame of the SEQuence is $I=0$, $N=0$. This selection will erase the stored number and cause a single Frame advance. This selection might be offered to a student who was convinced that he had not done well on the test and wished to go back to restudy any of a number of points which he might select from the following Frame.

In the Vector mode of SEQuence operation, data is transferred from frames to the register in a different fashion. For example, the first Frame of a Vector SEQuence might be encoded as follows:

appear with the Execute pulse following this selection). So, choice C results in a state:

$$\underbrace{0\ 0\ 1}_{I=1}\ \underbrace{0\ 1}_{\substack{\text{Just}\\\text{entered}}}\ \underbrace{0\ 1\ 0\ 1\ 1}_{\substack{\text{Stored from}\\\text{previous entries}}}$$

$$N=32+\ 0+\ 8+\ 0+\ 2+\ 1=43$$

Therefore, the Execute pulse will result in a $$(43+1)+1=45$$

Frame advance.

There are two choice sequences only which could have produced this 45 Frame advance. They are ABCC and AACC since on Frame 2 selections A and B are equivalent.

|  | $X_9$ | $X_8$ | $X_7$ | $X_6$ | $X_5$ | $X_4$ | $X_3$ | $X_2$ | $X_1$ | $X_0$ |
|---|---|---|---|---|---|---|---|---|---|---|
| Frame 1: | $I=7$ | | | | | | | | | |
| A | 1 | 1 | 1 | 0 | 0 | 1 | 1 | 1 | 1 | 1 |
| B | 1 | 1 | 1 | 0 | 0 | 1 | 1 | 1 | 1 | 0 |
| C | 1 | 1 | 1 | 0 | 0 | 0 | 1 | 1 | 0 | 1 |
| D | 1 | 1 | 1 | 0 | 0 | 1 | 1 | 1 | 0 | 0 |
| Next Frame 2: | | | | | | | | | | |
| A | 1 | 1 | 1 | 0 | 0 | 1 | 1 | 0 | 1 | 1 |
| B | 1 | 1 | 1 | 0 | 0 | 1 | 1 | 0 | 1 | 1 |
| C | 1 | 1 | 1 | 0 | 0 | 1 | 1 | 1 | 1 | 1 |
| D | 1 | 1 | 1 | 0 | 0 | 1 | 1 | 1 | 1 | 1 |
| Next Frame 3: | | | | | | | | | | |
| A | 1 | 1 | 1 | 0 | 0 | 1 | 1 | 1 | 1 | 1 |
| B | 1 | 1 | 1 | 0 | 0 | 1 | 0 | 1 | 1 | 1 |
| C | 1 | 1 | 1 | 0 | 0 | 0 | 1 | 1 | 1 | 1 |
| D | 1 | 1 | 1 | 0 | 0 | 0 | 0 | 1 | 1 | 1 |
| Next Frame 4: | $I=1$ (Advance $(N+1)+1$ Frames) | | | | | | | | | |
| A | 0 | 0 | 1 | 1 | 1 | 1 | 1 | 1 | 1 | 1 |
| B | 0 | 0 | 1 | 1 | 0 | 1 | 1 | 1 | 1 | 1 |
| C | 0 | 0 | 1 | 0 | 1 | 1 | 1 | 1 | 1 | 1 |
| D | 0 | 0 | 1 | 0 | 0 | 1 | 1 | 1 | 1 | 1 |
| Study of these tables reveals that a choice sequence: | | | | | | | | | | |
| Frame 1—A | 1 | 1 | 1 | 0 | 0 | 1 | 1 | 1 | 1 | 1 |
| Frame 2—B (or A) | 1 | 1 | 1 | 0 | 0 | 1 | 1 | 0 | 1 | 1 |
| Frame 3—C | 1 | 1 | 1 | 0 | 0 | 0 | 1 | 1 | 1 | 1 |
| Results in a State | 1 | 1 | 1 | 0 | 0 | 0 | 1 | 0 | 1 | 1 |

Since wherever any $X_0$–$X_4$ has been a 0 this fact is stored in the register. No other sequence of choices will result in this particular pattern.

When a selection is made on Frame 4, the inhibit from the previous Instruction, $I=7$, is still in effect (it will dis- Such a SEQuence would be useful in selecting clothing style for a particular weight range     sex
    height range
    age range The Selections of a Vector SEQuence are not equivalent as they may be in a Scalar SEQuence. Scalar and Vector SEQuence operations may be mixed.

The detailed logic of the SEQuence control block 108 is shown in FIG. 12. An Execute pulse will set the SEQuence flip-flop if:

$$EX \text{ AND } 132a = 1$$

it will reset the SEQuence flip-flop if:

$$EX \text{ AND } \overline{132a} = 1$$

Set pulses will be applied to $X_4$–$X_0$ if:

$$\overline{SEQ} \text{ AND } SET = 1$$

The pulse generator will run and apply weight pulses to $X_0$ and $X_5$ if:

$$X_6 \text{ OR } X_5 \text{ AND } RS \text{ AND } SEQ = 1$$

(Note: $X_6$ OR $X_5 = 1$ if $W = 2X_6 + X_5 \neq 0$)

On any but the first selection of a Vector SEQuence the user should make only one selection. To insure this, a Supervisory bit is employed. If $S_1$ (the second supervisory bit to the left of the F mark) is 0, a circuit (not shown) generates an Execute pulse a few milliseconds after a selection has been made.

$S_0$ (the first supervisory bit to the left of the F mark) may be used for another function. The auxiliary shutter solenoid 76 (FIG. 1) is energized when $$1 \leq I \leq 6 \text{ AND } \text{``RUN''} = 1$$

In order to display an animated graph, for example, a Frame bearing an $S_0 = 0$ marking is included in the film followed by a sequence of frames not bearing F marks whose images constitute a motion picture of the animated graph. This sequence is ended by a Frame. If the main shutter 62 opens on a frame bearing an $S_0$ mark and remains open for more than 100 ms., an Execute pulse is generated. The normal time for the main shutter 62 to open on a frame is approximately 15 ms. so that a Supervisory Execute pulse will not be generated unless the transport has stopped on this frame. If the transport has stopped, the register 100 will contain $I = 7$ or $I = 1$, $N = 127$ so that the Supervisory Execute pulse will cause the film transport to advance to the next Frame with the auxiliary shutter 74 open thus displaying the animated graph.

An embodiment of this invention employs 16 mm. sound motion picture film, defined by American Standards PH 22.109–1958, as the digital program and image store. A frame of this sequential store is the length of the film between sprocket hole center lines. The image is stored in the picture area defined by American Standards and the digital data is stored as a pattern of transparent or opaque patches in the sound track area, also defined by American Standards. This format permits film processing by standard equipment with independent control over processing of digital and image data.

Both digital data and image are projected: the digital data upon an array of photocells and the image upon a viewing screen where it can be seen by the user. A conveniently small number of keys (say, four) are provided to the user. Operation of one of these keys in accordance with the user's understanding or desire and the data contained in the image causes a selected portion of the digital data projected on the photocells to be communicated to the machine logic. Formally this is the formation of the logical product of the set "zero for all undepressed keys, one for the depressed key" and the set of digits projected upon the photocells. Means are provided for causing single frame advances of the film so that a combination of such logical products may be formed and employed to locate a new frame.

The scope of this invention is not limited to a teaching machine, nor to the particular embodiment and arrangement described herein. The inventive concept is applicable generally to data storage and retrieval systems wherein data is assimilated and classified according to a photographic bit code, and recorded on predetermined frames of a continuous photographic film. Each class of subject matter may be recovered separately by means of a selector key that initiates operation of the film transport in accordance with a selected code. It should be noted that the code used in this application may be varied to suit the needs of the individual machine. If necessary, the rows of coded bits may be increased, and the number of bits in each row may also be increased.

Other modifications and variations may be made within the scope of this invention.

A feature of the invention is that a continuous single reel of film may be used to store large amounts of information in a classified arrangement, and rapid retrieval and display is made possible by the code system which is an integral of the separate codes associated with each frame.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A teaching machine comprising:
    (a) a photographic film having a plurality of frames for storing associated data, each frame having a data portion and a code portion, said code portion including photographic bits selectively opaque and transparent in a predetermined format carrying binary information for directing the machine to display data of different frames in accordance with photographic bits which are selected from those forming the code portion of each frame, said code portion further including photographic frame counting and block counting bits selectively opaque and transparent,
    (b) photoelements arranged in a matrix substantially similar to the format of said photographic bits, frame counting bits, and block counting bits of said code portion so that each photoelement senses only the optical characteristics of a corresponding bit, said photoelements responsive to the optical characteristics of the photographic bits carrying binary information of a displayed frame by generating a signal representative of the location of the frame including data to be subsequently displayed;
    (c) a film transport for transporting said film in response to said signal;
    (d) optical means for directing radiation through said code portion to impinge said photoelements, said photoelements corresponding to said photographic bits carrying binary information responsive to radiation to generate said signal, said photoelements corresponding to said frame and block counting bits responsive to radiation to sense the traverse of frame and block counting bits through the optical means while the film is transported;
    (e) means for coupling said signal to actuate said film transport;
    (f) means responsive to photoelements corresponding to frame and block counting bits for sensing the number of frame and block counting bits that traverse the optical means while the film is transported; and
    (g) means for stopping the film transport when the number of sensed frame and block counting bits corresponds to the location of the frame represented by said signal.

2. The teaching machine according to claim 1 further comprising:
    (a) a film display screen for displaying the data portion of said frames;
    (b) optical means for projecting an image of the data onto said film display screen; and (c) means for blocking the display of data during transport of the film.

3. The teaching machine according to claim 1 wherein the photographic bits of said code portion are arranged in rows of identical number of bits.

References Cited

UNITED STATES PATENTS

| | | | |
|---|---|---|---|
| 2,209,342 | 7/1940 | Lougbridge et al. | 340—173 |
| 2,323,372 | 7/1943 | Bryce | 88—24 |
| 2,482,242 | 9/1949 | Brustman | 340—149 |
| 2,783,454 | 2/1957 | North | 35—5 |
| 2,820,907 | 1/1958 | Silverman | 88—10 |
| 3,123,920 | 3/1964 | Crowder et al. | 35—9 |
| 3,141,243 | 7/1964 | Chapman et al. | 35—9 |
| 3,191,315 | 6/1965 | Hannah | 35—9 |

EUGENE R. CAPOZIO, *Primary Examiner.*

R. E. KLEIN, R. W. WEIG, *Assistant Examiners.*